United States Patent [19]

Kim

[11] Patent Number: 4,581,413
[45] Date of Patent: Apr. 8, 1986

[54] VINYL DISPERSION RESINS
[75] Inventor: Jong S. Kim, Sheffield Lake, Ohio
[73] Assignee: The B. F. Goodrich Company, Akron, Ohio
[21] Appl. No.: 685,646
[22] Filed: Dec. 24, 1984
[51] Int. Cl.$^4$ .................. C08L 27/06; C08L 33/02
[52] U.S. Cl. .................. 525/221; 524/222; 525/207; 525/301; 525/285
[58] Field of Search .................. 525/221, 301; 524/522
[56] References Cited
U.S. PATENT DOCUMENTS 3,170,888 2/1965 Kutik et al. .................. 524/222
3,318,825 5/1967 Enk et al. .................. 525/221
3,835,116 9/1974 Lydick .................. 525/221
4,458,057 7/1984 Basu .................. 526/88

Primary Examiner—Carman J. Seccuro
Attorney, Agent, or Firm—J. Hughes Powell; Alan A. Csontos; Nestor W. Shust

[57] ABSTRACT

Vinyl dispersion resins containing a major proportion of vinyl chloride that provide fluid suspensions thereof with thixotropic properties are obtained by isolating and drying the vinyl chloride polymer resin from an emulsion (latex) thereof containing a small amount of a cross-linked, water-swellable polymer of an unsaturated carboxylic acid.

24 Claims, No Drawings

VINYL DISPERSION RESINS

BACKGROUND OF THE INVENTION

Vinyl dispersion resins are commercially available and find many applications, primarily in the form of fluid suspensions of fine particle size vinyl halide polymers. The vinyl dispersion resins are normally dispersed in plasticizers to form plastisols, or in volatile organic dispersants or thinners to form organosols. These dispersions usually also contain stabilizers, fillers, pigments and the like. When plastisols are heated, as to about 148° C. to about 177° C., fusion takes place and the dispersion forms a homogeneous hot melt that becomes a tough product when cooled to below about 50° C. In organosols, the organic volatiles are removed during fusion by the heat. These vinyl dispersions can be applied to substrates by spread coating, molding, extrusion, spray coating and the like. Particular problems are encountered in both extrusion and spray coating. For many applications it is necessary that the vinyl resins have thixotropic properties, that is, that they provide dispersions having high yield values at low shear rates, and lower viscosities at high shear rates. It has been found difficult to obtain such vinyl resins by polymerization and many techniques have been tried to obtain dispersions with this desireable property. Improved dispersion resins that provide the desired thixotropic properties in vinyl dispersions are needed.

SUMMARY OF THE INVENTION

Vinyl dispersion resins containing a major proportion of vinyl chloride that provide fluid suspensions thereof with thixotropic properties are obtained by isolating and drying the vinyl chloride polymer resin from an emulsion (latex) thereof containing a small amount of a cross-linked, water-swellable polymer of an unsaturated carboxylic acid.

DETAILED DESCRIPTION OF THE INVENTION

The vinyl dispersion resins are readily prepared by polymerizing a vinyl halide, as vinyl chloride, optionally with other vinylidene comonomers containing at least one terminal >$CH_2$ group, in water, in an emulsion with free radical forming catalysts to form a latex. The polymer particles in the latex in emulsion have particle sizes less than 15 microns, preferably from about 0.1 to 5.0 microns. The polymers have an inherent viscosity (ASTM-D 1243-66) of about 0.7 to about 1.4.

In addition to the vinyl chloride monomer, one or more other copolymerizable olefinically unsaturated vinylidene comonomers, preferably containing at least one terminal vinylidene group, >$CH_2$, more preferably a terminal methylene group ($H_2C=C<$), may also be employed therewith. The amount of vinyl chloride monomer will range from greater than about 50%, to 100% by weight of the total monomers polymerized. Usually less than about 50% by weight of the copolymerizable vinylidene comonomers is present in vinyl chloride copolymers. Copolymerizable comonomers include, for example, dienes of 4 to 10 carbon atoms, such as butadiene-1,3; ethylidene norborene, dicyclopentadiene and other cyclic dienes; α-olefins such as ethylene, propylene, isobutylene, butenel and 4-methyl-pentene-1, 1-octene, and the like, preferably containing 1 to 4 carbon atoms; vinyl bromide, vinylidene chloride, vinyl fluoride; vinyl esters such as vinyl acetate, vinyl benzoate, vinyl laurate and vinyl chloroacetate; vinyl aromatics such as styrene, chlorostyrene, α-methyl styrene, vinyl toluene and vinyl naphthalene; alkyl vinyl ethers and ketones such as methyl vinyl ether, isobutyl vinyl ether, N-butyl vinyl ether, chloroethyl vinyl ether, isobutyl vinyl ether, methyl vinyl ketone, ethyl vinyl ketone, and the like; α,β-olefinically unsaturated nitriles such as acrylonitrile, methacrylonitrile; cyanoalkyl acrylates such as α-cyanomethyl acrylate and the α-,β- and γ-cyanopropyl acrylates; esters of olefinically unsaturated carboxylic acids including α,β-olefinically unsaturated acids such as methyl acrylate, ethyl acrylate, butyl acrylate, isobutyl acrylate, and the like wherein the alkyl groups contain 1 to 20, preferably 1 to 8, carbon atoms, haloalkyl acrylates as chloropropyl acrylate; methacrylate esters such as methyl methacrylate, ethyl methacrylate, methyl ethacrylate, 2-ethylhexyl acrylate, dodecyl methacrylate, stearyl methacrylate, cyclohexyl acrylate, phenyl acrylate, glycidyl acrylate, glycidyl methacrylate, ethoxyethyl acrylate, and the like; esters of maleic and fumaric acid as methyl fumarate, ethyl maleate and the like; bis(β-haloalkyl)alkenyl phosphonates such as bis(β-chloroethyl)vinyl phosphonate; amide monomers derived from an α,β-olefinically unsaturated carboxylic acid and having the structural formula

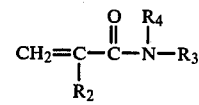

wherein $R_2$ is hydrogen or an alkyl group containing from 1 to 4 carbon atoms and $R_3$ and $R_4$ are hydrogen or a radical containing from 1 to 12 carbon atoms and more preferably an alkyl group containing from 1 to 8 carbon atoms including acrylamide and methacrylamide, N-propyl acrylamide, diacetone acrylamide and the like; α,β-γ olefinically unsaturated N-alkylol amides or α,β-olefinically unsaturated N-alkoxyalkyl amides of the formula

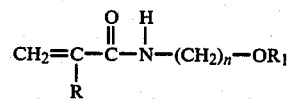

wherein R is hydrogen or an alkyl group containing from 1 to 4 carbon atoms, $R_1$ is hydrogen or an alkyl group containing from 1 to 8 carbon atoms and n is an integer from 1 to 4, including N-methylol acrylamide, N-methylol methacrylamide. Mixtures of any of these types of monomers and other unsaturated polymerizable olefinic monomers copolymerizable therewith; and other polymerizable olefinic monomers of the types known to those skilled in the art.

Preferred comonomers for dispersion copolymers are less than 10 weight percent of the copolymer of vinyl acetate, methyl, ethyl, butyl and hexyl acrylates, acrylic acid, maleic acid, fumaric acid, N-methylol or N-propylacrylamide, and the like.

For aqueous emulsion polymerization techniques to provide the desired latices, the aqueous reaction medium will contain one or more emulsifiers, or emulsifier systems such as a salt of a long chain fatty acid and a long straight chain saturated alcohol. Alkali metal or ammonium salts of long chain saturated fatty acids may be used as the emulsifier or as part of the emulsifier system. The saturated fatty acids may be either natural or synthetic and should contain from 8 to 20 carbon atoms. Examples of such acids are lauric, myristic, palmitic, stearic, and the like, beef tallow, coconut oil, resin acids, naphthenic acids and the like. Excellent results are obtained when the anionic emulsifiers are alkali metal or ammonium salts of the sulfates of alcohols having from 8 to 18 carbon atoms. Examples of such emulsifiers include sodium lauryl sulfate, ethanolamine lauryl sulfate, ethylamine lauryl sulfate, and the like; alkali metal and ammonium salts of sulfonated petroleum and parraffin oils; sodium salts of hydrocarbon sulfonic acids, such as dodecane-1-sulfonic acid and octadiene-1-sulfonic acid; sodium salts of alpha-olefin sulfonates; aralkyl sulfonates, such as sodium isopropyl benzene sulfonate, sodium dodecyl benzene sulfonate, sodium isobutyl naphthalene sulfonate, and the like; alkali metal and ammonium salts of sulfonate dicarboxylic acid esters, such as sodium dicetyl sulfosuccinate, disodium-octadecyl sulsuccinate, and the like; alkali metal and ammonium salts of free acid of complex organic mono- and di-phosphate esters, and the like; nonionic emulsifiers such as octyl- or nonyl-phenyl polyethoxyethanol; poly(alkoxy)non-ionics, and particularly polyethers as poly(oxyethylene) sorbitol laurate, poly(oxyethylene)stearates, poly(oxyethylene) esters of mixed fatty and rosin acids, fatty alcohol ethylene oxide condensates, glycerol monostearate, sorbitan esters of fatty acids, diethylene glycol stearate and the like may be used.

Vinyl dispersion polymer latices having excellent stability are obtained when employing the alkali metal and ammonium salts of aromatic sulfonic acids, aralkyl sulfonates and long chain sulfonates. The emulsifier is employed usually in an amount in the range of about 0.1% to about 10.0% by weight, preferably to 4.0%, based on the weight of monomer or monomers being polymerized, and preferably, an amount of emulsifier in the range of about 0.5% to about 3.0% is used. When employing more than one emulsifier in the system, the combined weight thereof will be in the same ranges.

In addition to the compounds named above, it is very often desirable, in order to obtain certain desirable vinyl dispersion resin properties, to employ in the polymerization one or more long straight chain alcohols, containing from 8 to 24 carbon atoms, in the emulsifier system. Examples of such alochols are octanol, nonanol, decanol, undecanol, dodecanol, tridecanol, tetradecanol, pentadecanol, heptadecanol, octadecanol, nonadecanol, eicosanol, heneicosanol, docosanol, tricosanol, tetracosanol, and the like. Mixtures of alcohols may be used as a 12 carbon alcohol plus an 18 carbon alcohol, for example dodecanol and octadecanol. Further, ethoxylated alcohols can be used, such as a mixture of ethoxylated linear primary alcohols containing from 12 to 15 carbon atoms, etc. The ratio of alcohol to emulsifier can range from 0.15 to 1.0 or greater depending upon the emulsifier being used. For example, when the emulsifier is an ammonium salt of a fatty acid, the ratio of alcohol to fatty acid salt can be 1.0 but preferably the ratio is greater than 1.0 to 4.0.

In the aqueous polymerization of vinyl monomers, the polymerization is conducted at a pH in the range of about 2.0 to about 10.0. The pH is easily adjusted with a base or an acid for example $NH_4OH$ or $H_2SO_4$ and the like. The amount of alkaline agent or acid needed to properly adjust and maintain the proper pH will depend in part on the particular system being used in the reaction mixture. Other usual additives such as buffers, modifiers and the like may be used.

The polymerization temperature will usually be in the range of about 5° C. to about 100° C., preferably at a temperature in the range of about 40° C. to about 55° C. Polymerizations are normally conducted until greater than 50 weight percent of the monomers are converted into polymers, preferably about 85% or more. The lactices normally contain from about 20 to about 55 weight percent total solids.

When the polymerization reaction is complete, the reactor is put under vacuum in order to remove as much of the unreacted monomers as possible and sent to a recovery system. The vinyl polymer latex is normally pumped into a vacuum tank along with steam wherein the monomer, such as vinyl chloride, is flashed off and sent to the recovery system.

In carrying out the polymerization reaction the usual catalysts or initiators which normally form free radicals, including organic peroxides and aliphatic azo compounds may be used. Such materials include, for example, $\alpha,\alpha'$-azodiisobutyronitrile and the like; organic peroxides including diacyl peroxides such as acetyl peroxide in dimethyl phthalate, benzoyl peroxide, 2,4-dichlorobenzoyl peroxide, lauroyl peroxide, pelargonyl peroxide; peroxyesters such as esterbutyl peroxyacetate, tert-butyl peroxyisobutyrate, tert-butyl peroxypivalate, tert-butyl peroxy(2-ethyl-hexanoate); alkyl peroxides such as $\alpha,\alpha'$-bis-(t-butylperoxy)diisopropylbenzene, n-butyl-4,4-bis(tert-butylperoxy)valerate, di-tert-amyl peroxide, dicumyl peroxide, 2,5-dimethyl-2,5-bis(tert-butyl hydroperoxide), 1,1,3,3-tetramethyl butyl hydroperoxide, 2,5-dimethylhexane-2,5-dihydroperoxide, diisopropylbenzene hydroperoxide; ketone peroxides; methyl ethyl ketone peroxides, sulfonyl acyl peroxides such as acetyl cyclohexyl sulfonyl peroxide; acetyl sec-heptylsulfonyl peroxide; peroxy carbonates such as tert-butylperoxy isopropyl carbonate; peroxy dicarbonates such as bis(4-t-butylcyclohexyl)peroxy dicarbonate, dicyclohexyl peroxydicarbonate, diisopropyl peroxydicarbonate; di(2-ethyl hexyl)peroxydicarbonate, tertiary alkyl perketals such as 2,2-bis(tert-butylperoxy)butane; bis(4-tert-butyl cyclohexyl)peroxydicarbonate; di-(2-ethyl hexyl)peroxydicarbonate, diisononanoyl peroxide, t-butyl hydroperoxide, t-butytyl peroxypivalate, cumene hydroperoxide, cyclohexyl hydroperoxide, tert-butyl peroxyneodecanoate, and the like. Useful initiators or catalysts also included are the water-soluble peroxygen compounds, such as hydrogen peroxide, the persulfates, such as potassium persulate, ammonium persulate, and the like. Also, mixtures of catalysts or initators may be employed, either water-insoluble or water-soluble or both. Particularly useful initiators are the water-soluble peroxygen compounds, such as hydrogen peroxide, isopropyl peroxydicarbonate, and the like, and the sodium, potassium and ammonium persulfates used by themselves or in an activated redox system. Typical redox systems include alkali metal persulates in combination with a reducing substance, such as sodium sulfite or sodium bisulfite, a reducing sugar, dimethylamino propionitrile, a diazomercapto compound and a water-soluble ferricyamide compound, or the like. Heavy metal ions may also be used to activate the persulfate catalyzed polymerization. Particularly useful are alkali metal and ammonium persulfate. The amount of initiator used will generally be in the range between about 0.02% and about 1.0% by weight, based on the weight of 100 parts of monomer or monomers being polymerized, and preferably an amount between about 0.05% and about 1.0% by weight.

The polymerization reactions are normally conducted by batch charging, but semi-continuous or continuous polymerization reactions may be used. The materials used in the polymerization may be charged to the reactor at one time or part of the materials may be charged initially and the remainder added later. The reaction materials also may be proportioned during the course of the reaction singly or mixed, all of which techniques are well known to those skilled in the art.

The critical and essential cross-linked, water-swellable polymer of unsaturated carboxylic acids may be obtained in a variety of ways and with a variety of comonomers. Typical cross-linked polymers are, for example, acrylic acid polymers cross-linked with small amounts of polyalkenyl polyethers (U.S. Pat. No. 2,798,053); acrylic acid polymers cross-linked with an oligomer of an allyl-containing ester of acrylic or methacrylic acid (U.S. Pat. No. 4,085,167); maleic anhydride-styrene copolymers cross-linked with divinyl benzene (U.S. Pat. No. 2,533,635); ethylene-maleic anhydride interpolymers cross-linked with triallyl isocyanurate (U.S. Pat. No. 3,951,926); and the like. Other cross-linked carboxylic acid polymers are described in U.S. Pat. Nos. 2,340,110, 2,340,111 and 2,533,635. Particularly useful are those cross-linked, water-swellable copolymers described in U.S. Pat. Nos. 2,798,053, 3,940,361, 4,059,552, 4,062,817 and 4,066,583.

The cross-linked carboxyl containing polymers are typically prepared from vinylidene monomers containing at least one terminal $>CH_2$ group. Such polymers may be homopolymers or copolymers of an unsaturated, polymerizable carboxylic monomer such as acrylic acid, maleic acid, itaconic acid and the like, or copolymers thereof. Typical useful materials are those described in U.S. Pat. No. 2,798,053. Copolymers, for example, include copolymers of acrylic acid with small amounts of polyalkenyl polyether cross-linkers that are gel-like polymers, which absorb large quantities of water or solvents with subsequent substantial increase in volume. Other useful carboxyl containing polymers are described in U.S. Pat. No. 3,940,351, directed to polymers of unsaturated carboxylic acid and at least one acrylic or methacrylic ester where the alkyl group contains 10 to 30 carbon atoms. Other types of such copolymers are described in U.S. Pat. No. 4,062,817. The carboxyl containing polymers have molecular weights greater than about 500 to several million, usually greater than about 10,000 to 900,000 or more.

These carboxyl-containing materials are normally prepared in organic media as hydrocarbons and chlorinated hydrocarbons, for example, benzene, xylene, tetraline, hexane, heptane, carbon tetrachloride, methyl chloride, ethyl chloride and the like. Polymerizations are disclosed, for example, in U.S. Pat. No. 4,062,817 wherein the polymerizations are desirably conducted in the presence of haloethane or halomethane, preferably containing at least 4 halogen atoms, for example, 1,1,2-trichloro-1,2,2-trifluoro-ethane. Other carboxyl containing polymers prepared in similar systems include those described in U.S. Pat. No. 4,066,583. Preferably solvents are used that are solvents for the monomers, but non-solvents for the polymers.

The carboxylic acid monomers useful in the production of the polymers of this invention are the olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group, $-C=C-COOH$; or as a part of a terminal methylene grouping $CH_2=C<$. Olefinically-unsaturated acids of this class include such materials as the acrylic acids typified by the acrylic acid itself, methacrylic acid, ethacrylic acid, alphachloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, citraconic acid, mesaconic acid, glutaconic acid, aconitric acid, maleic acid, fumaric acid, and tricarboxy ethylene. As use herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydride useful herein have the general structure

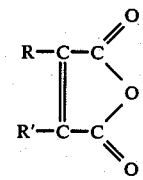

wherein R and R' are selected from the group consisting of hydrogen, halogen and cyanogen ($-C\equiv N$) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers for use in this invention are the monoolefinic acrylic acids having the general formula

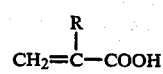

wherein R is a substituent selected from the class consisting of hydrogen, halogen, and the cyanogen ($-C\equiv N$) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred because of generally lower cost, ready availability and ability to form superior polymers. Another useful carboxylic monomer is maleic anhydride or the acid.

The polymers contemplated include both cross-linked homopolymeric carboxylic acids or anhydrides thereof, or the defined carboxylic acids are copolymerized with one or more other vinylidene monomers containing at least one terminal $CH_2=CH_2<$ group. Such materials include, for example, acrylic ester monomers including those acrylic ester monomers having long chain aliphatic groups such as derivatives of an acrylic acid represented by the formula

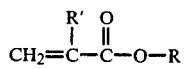

wherein R is an alkyl group having from 10 to 30 carbon atoms, preferably 10 to 20 carbon atoms, and R' is hydrogen or a methyl or ethyl group, present in the copolymer in amount, for example, from about 1 to 30 weight percent, and form some uses more preferably, about 5 to 15 weight percent. Representative higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic monomers. One useful class of copolymers are those methacrylates where the alkyl group contains 16 to 21 carbon atoms. Typical polymers have been made with 15±5 weight percent isodecyl methacrylate, 10±3 weight percent lauryl methacrylate, 7±3 weight percent stearyl methacrylate, with acrylic acid.

Other acrylic esters contemplated are also derivatives of an acrylic acid represented by the formula

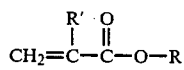

wherein R is an alkyl, alkoxy, haloalkyl, cyanoalkyl, and like groups having from 1 to 9 carbon atoms, and R' is hydrogen or methyl or ethyl group. These acrylic esters are present in the copolymer for some uses in amount from about 5 to 30 weight percent and more preferably from about 5 to 25 weight percent. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, cyanoethyl acrylate, hydroxyethyl acrylate, chloropropyl acrylate, and the like. Mixtures of these two classes of acrylates provide useful copolymers.

The polymers are cross-linked with any polyfunctional vinylidene monomer containing at least 2 terminal $CH_2<$ groups, including for example, butadiene, isoprene, divinyl benzene, divinyl naphthlene, allyl acrylates and the like. Particularly useful cross-linking monomers for use in preparing the copolymers are polyalkenyl polyethers having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 4 carbon atoms and at least 3 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include, for example, diallyl esters, dimethallyl ethers, allyl or methallyl acrylates and acrylamides, tetraallyl tin, tetravinyl silane, polyalkenyl methanes, diacrylates and dimethacrylates, divinyl compounds as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, tetramethylene diacrylate, ethylene glycol diacrylate, ethylene dimethacrylate, triethylene glycol dimethacrylate, N,N'-methylene-bis-acrylamide, and the like. Allyl pentaerythritol and allyl sucrose provide excellent polymers in amounts less than 5, as less than 3.0 weight percent.

The monomeric mixtures usually contain up to about 5 percent by weight of cross-linking monomer based on the total of carboxylic acid monomer, plus other monomers, if present, and more preferably about 0.1 to 2.0 weight percent.

Other vinylidene comonomers may also be used, including α,β-olefinically unsaturated nitriles, preferably the monoolefinically unsaturated nitriles having from 3 to 10 carbon atoms such as acrylonitrile, methacrylonitrile, ethacrylonitrile, chloroacrylonitrile, and the like. Most preferred are acrylonitrile and methacrylonitrile. The amounts used are, for example, for some polymers, from about 5 to about 30 weight percent of the total monomers copolymerized. Acrylic amides include monoolefinically unsaturated amides having at least one hydrogen on the amide nitrogen and the olefinic unsaturation is alphabeta to the carbonyl group. Representative amides include acrylamide, methacrylamide, N-methyl acrylamide, N-t-butyl acrylamide, N-cyclohexyl acrylamide, N-ethyl acrylamide, and others. Preferred are acrylamide and methacrylamide used in amounts, for example, from about 1 to 30 weight percent of the total monomers copolymerized. Other acrylic amides include N-alkylol amides of alpha, beta-olefinically unsaturated carboxylic acids including those having from 4 to 10 carbon atoms such as N-methylol acrylamide, N-ethanol acrylamide, N-propanol acrylamide, N-methylol methacrylamide, N-ethanol acrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are the N-alkylol amides of alpha, beta-monoolefinically unsaturated monocarboxylic acids and the most preferred are N-methylol acrylamide and N-methylol methacrylamide used in amounts, for example, of about 1 to 20 weight percent. N-alkoxymethyl acrylamides also may be used. It is thus intended that where references are made herein regarding the essential N-substituted alkoxymethyl amides, the term "acrylamide" includes "methacrylamide" within its meaning. The preferred alkoxymethyl acrylamides are those wherein $R_6$ is an alkyl group containing from 2 to 5 carbon atoms and useful is N-butoxymethyl acrylamide.

Other useful vinylidene comonomers include, in addition to those described above, at least one other olefinically unsaturated monomer, including α-olefins containing from 2 to 12 carbon atoms, more preferably from 2 to 8 carbon atoms; dienes containing from 4 to 10 carbon atoms including butadiene; vinyl esters and allyl esters such as vinyl acetate; vinyl aromatics such as styrene; vinyl and allyl ethers and ketones such as vinyl methyl ether and methyl vinyl ketone; vinyl halides and vinyl chloride, vinylidene chloride and the like; esters of maleic and fumaric acid and the like.

Polymerization of the monomers to form the water-swellable cross-linked carboxylic acid polymers in a solvent or diluent medium is usually carried out in the presence of a free radical catalyst in a closed vessel in an inert atmosphere under autogenous pressure or artificially induced pressure, or in an open vessel under reflux at atmospheric pressure. Temperature of the polymerization may be varied from about 0° to 100° C. or lower or higher, depending to a degree on the molecular weight desired in the polymer. Polymerization at 25° to 90° C. under autogenous pressure using a free radical catalyst is generally effective in producing polymer yields of 75% to 100%. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like, as well as azo catalysts and azodiisobutyryl nitrile, hereinafter referred to as azoisobutyronitrile. Other catalysts utilizable are the so-called "redox" type of catalyst and the heavy-metal activated catalyst systems. Ultraviolet light may also be used as a source of free radicals. Some systems polymerize solely by heat, but catalysts provide better control. The monomer may be batch charged or continuously added during the course of polymerization or by any other manner of polymerization techniques conventionally used.

The cross-linked, water-swellable carboxylic acid polymer must be in latex before the polymer is isolated from the vinyl dispersion resin latex, as by drying. While dispersion resins are normally separated from the water of the latex by spray drying, other methods of isolating the polymer and drying it are contemplated. In any method of isolating the polymer and/or drying it, the cross-linked, water-swellable carboxylic acid polymer must be present in the latex before such steps. Other non-spray drying methods are described, for example: in U.S. Pat. No. 4,292,424 the latex is coagulated, the wet cake is rinsed, pressed, broken up, and dried and ground in a fluid energy mill; in U.S. Pat. No. 4,286,081 the polymerization is conducted in the presence of ammonium carbonate, then filtering, washing and drying the friable aggregates. In each case the crosslinked, water-swellable carboxylic acid polymer should be present in the latex before the polymer is isolated and/or dried. Similarly, when spray drying a vinyl dispersion polymer latex, the cross-linked, water-swellable carboxylic acid polymer is present in the latex before the latex is spray dried, being present during the polymerization reaction or added to the latex before stripping, after stripping, and at any point prior to the drying step.

The amounts of cross-linked, water-swellable carboxylic acid polymer used will vary from greater than about 0.001 weight part per 100 weight parts of latex total solids to about 1 weight part. Normally the amount used will be from about 0.01 to about 0.5 weight parts. Minimum amounts to provide the desired thixotropic dispersion resin are desired, and excess amounts are not used because of cost and other detrimental reasons.

The practice of the invention is demonstrated in the Examples.

EXAMPLE I 0.8 weight percent of polyacrylic acid cross-linked with 0.25 weight percent allyl pentaerythritol in water was added to vinyl chloride polymer (GEON 121 dispersion resin) latex in amounts to provide 0.04 and 0.06 weight parts of the cross-linked polyacrylic acid per 100 weight parts of polymer. This latex contained about 40 weight percent of vinyl chloride polymer, the average particle size of the polymer was 0.9 micron, the inherent viscosity of the polymer (ASTM-D 1243-66) was 1.2 and the latex had a pH of 4.0. The mixture of latex aqueous solution of cross-linked polyacrylic acid was stirred and then spray dried at a 20 pound per hour latex flow rate and at a dryer chamber temperature of 135° F. 100 weight parts of the resulting fine dry powder was mixed with 57 weight parts of dioctyl phthalate plasticizer, 3 weight parts of epoxidized soya oil (Paraplex G-62) and 2 weight parts of calcium, cadmium, zinc fatty acid stabilizers (Synpron 940) in a Hobart internal mixer. These two samples, along with a control, were tested for viscosity after preparation, after 1 and 7 days, with a Brookfield Viscometer at 2 RPM and 20 RPM. The Severs efflux in grams/100 second also were determined (ASTM-D 1823-66). The results obtained are in Table 1. The substantial increase in plastisol viscosity is readily apparent as well as the desired thixotropic behavior.

TABLE I

| Parts of Cross-linked Polymer<br>Brookfield Viscosity<br>($V_2/V_{20}$), Value in Poise | 0 | 0.04 | 0.06 |
| --- | --- | --- | --- |
| Initial | 210/106 | 540/122 | 520/120 |
| 1 Day | 300/135 | 600/152 | 570/148 |
| 7 Days | 400/152 | 650/195 | 700/215 |
| Severs efflux - grams/100 seconds | 17.6 | 16.2 | 16.1 |

EXAMPLE II

The vinyl dispersion resin latex used in this example was a resin latex of vinyl chloride polymer (GEON 178) that had a total solids content of 40 weight percent, a pH of 9, a polymer I.V. of 1.2, and an average bimodel particle size in the range of 0.3 and 0.9 microns. 0.1 weight part of various polyacrylic acids dissolved in water were added to the latex using the procedure of Example I. After spray drying, the samples were mixed with DOP and the stabilizers described in Example I. The Brookfield viscosities, initially, after 1 day and after 7 days, were determined. The Severs efflux was also determined on the samples. The following polyacrylic acids were tested:

A-polyacrylic acid, not cross-linked, mol. wt. 180,000
B-polyacrylic acid, not cross-linked, mol. wt. 5,100
C-polyacrylic acid cross-linked with allyl pentaerythritol, mol. wt. 450,000
D-polyacrylic acid cross-linked with allyl pentaerythritol, mol. wt. 1,250,000
E-97 weight percent acrylic acid-3 weight percent stearyl methacrylate copolymer, cross-linked with allyl pentaerythritol, mol. wt. 400,000.

The results are listed in Table II. The large, useful, and unexpected improvement in Brookfield viscosity, and criticality of the use of the cross-linked carboxylic acid polymer in the dispersion resins is obvious, C, D, and E compared to A and B of Table II. The ratio of $V_2/V_{20}$ of the compositions of this invention are also in a very useful range.

TABLE II

|  | Polyacrylic Acid | | | | |
| --- | --- | --- | --- | --- | --- |
|  | A | B | C | D | E |
| Brookfield Viscosity ($V_2/V_{20}$), poise |  |  |  |  |  |
| Initial | 120/54 | 200/150 | 650/325 | 1350/465 | 575/225 |
| 1 Day | 168/80 | 200/122 | 800/285 | 1600/520 | 750/300 |
| 7 Days | 204/105 | 600/262 | 1400/566 | 2580/834 | 1150/440 |
| Severs Efflux (g/100 sec) | 24.2 | 19.2 | 14.6 | 10.7 | 5.7 |

EXAMPLE III

A vinyl chloride dispersion polymer latex (GEON 124), having a total solids of 40 weight percent, a polymer inherent viscosity of 0.9, a pH of 4, and an average latex polymer particle size of 0.9 micron was mixed with 0.1 weight part of the cross-linked polyacrylic acid of Example I as described therein before spray drying the latex. The resulting spray dried product was tested as described and compared to a control spray sample of the GEON 124 that did not contain the cross-linked polyacrylic acid. The results obtained are listed in Table III below.

TABLE III

|  | Control | Example III |
| --- | --- | --- |
| Brookfield Viscosity ($V_2/V_{20}$), poise |  |  |
| Initial | 200/98 | 2600/580 |
| 1 Day | 320/136 | 3000/700 |
| 7 Days | 450/190 | 3600/900 |
| Severs Efflux (g/100 sec.) | 18.9 | 5.5 |
| Gel Temperature | 157° C. | 162° C. |

EXAMPLE IV

In this Example, the cross-linked, water-swellable carboxylic acid polymer was present during the polymerization reaction. The emulsion latex recipe and procedure employed was:

|  | Parts |
| --- | --- |
| Vinyl Chloride | 100 |
| Demineralized Water | 130 |
| Alcohol $C_{12}$-$C_{18}$ | 2.1 |
| Sodium lauryl sulfate | 0.9 |
| Di-(2-ethyl hexyl) peroxydicarbonate | 0.05 |
| Cross-linked polyacrylic acid | 0.2 |

The cross-linked polymer was the polyacrylic acid of Example I cross-linked with 0.25% allyl pentaerythritol. A monomer premix tank or vessel equipped with an agitator or stirrer was evacuated. The premix tank was charged with water and, under agitation, with the emulsifier, followed by the alcohol and the catalysts, and the vinyl chloride. The temperature of the premix tank was controlled at about 25° C. by means of a cooling jacket. The mixture was agitated for about 15 minutes and thereafter was passed through a Manton Gaulin 2 stage homogenizer at a temperature of 25° C. into the polymerization reactor which had previously been evacuated. The pressure in the first stage of the homogenizer was 600 psig and in the second stage was 700 psig. The contents of the reactor were agitated and heated to the reaction temperature of 45° C. and held there throughout the reaction until the desired conversion of approximately 85% was obtained. Thereafter the reactor was cooled, vented and the contents thereof emptied into a stripping tank wherein the unreacted monomer was remved by means of steam passing through the mixture.

The stripped latex was then spray dried and tested for plastisol viscosity as described in the Examples above. The results obtained were: Initial Viscosity ($V_2/V_{20}$)=2020/500 poises; after 1 day, 1580/480 poises; and after 7 days, 1110/450 poises. This demonstrates that the cross-linked carboxylic acid polymer is efficiently present during polymerization of the vinyl chloride polymers, or is just as effective when added to the latex after polymerization, so long as it is present in the latex before isolation of the polymer from the latex.

EXAMPLE V

Another emulsion latex was prepared using the recipe of Example IV except that the cross-linked polyacrylic acid was not present during the polymerization. Varying amounts of the cross-linked polyacrylic acid, from 0 to 0.3 weight parts per 100 weight parts of polymer, were added to this latex after the polymerization and the latex spray dried. The resulting resins were tested for plastisol viscosity as described in the Examples above. The results obtained are listed in Table IV below.

TABLE IV

|  | Control | Sample A | Sample B |
| --- | --- | --- | --- |
| Parts of cross-linked Polymer (phr) | 0 | 0.1 | 0.3 |
| Brookfield Viscosity ($V_2/V_{20}$), poise |  |  |  |
| Initial | 170/105 | 880/280 | 2300/580 |
| 1 Day | 225/138 | 1035/338 | 3080/880 |
| 7 Days | 220/140 | 1365/415 | 4300/1192 |
| Severs Efflux (g/100 sec.) | 12.9 | 9.7 | 4.4 |

All of the vinyl chloride dispersion polymers prepared in accordance with this invention having the cross-linked water-swellable unsaturated carboxylic acid polymers in the polymer latex before isolating and/or drying the polymers, when mixed with plasticizer formulations, demonstrate extremely useful increased viscosity values; have good yield ratios, i.e., $V_2/V_{20}$, preferably above about 3; good Severs flow values at high shear rate.

These improved thixotropic dispersion resins find many applications, especially in demanding sealant and undercoating applications, as in the automotive industry; including applications between metal joints to prevent rust, to the underbody around wheel housings by spraying, in paints, and the like.

I claim:

1. A method for providing improved vinyl dispersion resins having particle sizes less than 15 microns containing a major proportion of vinyl chloride and having thixotropic properties, comprising isolating and drying the vinyl dispersion resin from a latex of the vinyl dispersion resin containing a small amount of a cross-linked, water-swellable polymer of an unsaturated carboxylic acid.

2. A method of claim 1 wherein the vinyl dispersion resin particles are about 0.1 to about 5 microns in size and contain at least about 90 weight percent polymerize vinyl chloride and the cross-linked water-swellable polymer is a polymer of a carboxylic acid monomer containing at least one activated carbon-to-carbon olefinic double bond, cross-linked with a polyfunctional vinylidene monomer containing at least two terminal $CH_2{<}$ groups.

3. A method of claim 2 wherein said vinyl chloride is copolymerized with at least one other vinylidene comonomer having a terminal $CH_2{=}CH_2{<}$ group, the carboxylic acid has an olefinic double bond in the alpha, beta position with respect to the carboxyl group or is part of a terminal methylene grouping, and the cross-linking agent is a polyalkenyl polyether.

4. A method of claim 3 wherein said vinyl chloride is present in the polymer in amount from about 90 to 100 weight percent and there is present in the copolymer from 0 to about 10 weight percent of a comonomer selected from the group consisting of vinyl acetate and alkyl acrylates wherein the alkyl group contain from 1 to 8 carbon atoms.

5. A method of claim 4 wherein the carboxylic acid is acrylic acid and the polyalkenyl polyether is present in amounts from about 0.05 to 1.0 weight percent, said cross-linked polymer present in the latex in amounts from about 0.001 to about 1 weight part per 100 weight parts of polymer solids in the latex.

6. A method of claim 5 wherein said polyalkenyl polyether is present in the cross-linked polymer in amounts from about 0.01 to about 0.5 weight parts.

7. A method of claim 6 wherein the vinyl chloride polymer is polyvinyl chloride.

8. A method of claim 7 wherein the polyalkenyl polyether is allyl pentaerythritol.

9. A method of claim 7 wherein the polyalkenyl polyether is allyl sucrose.

10. A method of claim 7 wherein the polyalkenyl polyether is trimethylol propane diallyl ether.

11. A method of claim 6 wherein said vinyl dispersion resin is polyvinylchloride.

12. A method of claim 6 wherein said vinyl dispersion resin is a copolymer containing about 90 to 99 weight percent vinyl chloride and about 1 to 10 weight percent of an alkyl acrylate wherein the alkyl groups contain 1 to 4 carbon atoms.

13. Thixotropic vinyl dispersion resins prepared by the method of claim 1.

14. Thixotropic vinyl dispersion resins prepared by the method of claim 2.

15. Thixotropic vinyl dispersion resins prepared by the method of claim 3.

16. Thixotropic vinyl dispersion resins prepared by the method of claim 4.

17. Thixotropic vinyl dispersion resins prepared by the method of claim 5.

18. Thixotropic vinyl dispersion resins prepared by the method of claim 6.

19. Thixotropic vinyl dispersion resins prepared by the method of claim 7.

20. Thixotropic vinyl dispersion resins prepared by the method of claim 8.

21. Thixotropic vinyl dispersion resins prepared by the method of claim 9.

22. Thixotropic vinyl dispersion resins prepared by the method of claim 10.

23. Thixotropic vinyl dispersion resins prepared by the method of claim 11.

24. Thixotropic vinyl dispersion resins prepared by the method of claim 12.

* * * * *